United States Patent
Tsoi et al.

(10) Patent No.: US 12,216,611 B2
(45) Date of Patent: Feb. 4, 2025

(54) ARTIFICIAL INTELLIGENCE CHIP AND ARTIFICIAL INTELLIGENCE CHIP-BASED DATA PROCESSING METHOD

(71) Applicant: Shenzhen Corerain Technologies Co., Ltd., Guangdong (CN)

(72) Inventors: Kuen Hung Tsoi, Guangdong (CN); Xinyu Niu, Guangdong (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 183 days.

(21) Appl. No.: 18/069,216

(22) Filed: Dec. 20, 2022

(65) Prior Publication Data

US 2023/0126978 A1 Apr. 27, 2023

Related U.S. Application Data

(63) Continuation-in-part of application No. PCT/CN2021/101414, filed on Jun. 22, 2021.

(30) Foreign Application Priority Data

Jun. 22, 2020 (CN) .......................... 202010575487.1

(51) Int. Cl.
*G06F 11/30* (2006.01)
*G06F 11/34* (2006.01)
(Continued)

(52) U.S. Cl.
CPC ............ *G06F 15/825* (2013.01); *G06F 21/44* (2013.01)

(58) Field of Classification Search
None
See application file for complete search history.

(56) References Cited

U.S. PATENT DOCUMENTS

| | | | | |
|---|---|---|---|---|
| 6,715,007 | B1 * | 3/2004 | Williams | .............. H04L 47/263 |
| | | | | 370/231 |
| 6,950,428 | B1 * | 9/2005 | Horst | .................... H04L 49/357 |
| | | | | 370/389 |

(Continued)

FOREIGN PATENT DOCUMENTS

| | | |
|---|---|---|
| CN | 108256640 A | 7/2018 |
| CN | 109272112 A | 1/2019 |

(Continued)

OTHER PUBLICATIONS

International search report of PCT Patent Application No. PCT/CN2021/101414 issued on Sep. 22, 2021.

*Primary Examiner* — Hyun Nam

(57) ABSTRACT

Embodiments of the present disclosure provide an artificial intelligence (AI) chip and an AI chip-based data processing method. The AI chip includes: a data flow network for processing, on the basis of an AI algorithm, data to be processed. The data flow network includes: at least one calculation module, each configured to calculate, on the basis of one of at least one operation node corresponding to the AI algorithm, the data to be processed, and output a calculation result; and a next transfer module corresponding to each calculation module, connected to each calculation module, and configured to receive the calculation result output by each calculation module and process the calculation result, the data to be processed flowing in the data flow network according to a preset data flow direction.

6 Claims, 4 Drawing Sheets

(51) Int. Cl.
    *G06F 15/82*         (2006.01)
    *G06F 21/44*         (2013.01)

(56) References Cited

U.S. PATENT DOCUMENTS

| | | | | |
|---|---|---|---|---|
| 2016/0105364 | A1* | 4/2016 | Kanonakis | H04L 47/10 |
| | | | | 370/235 |
| 2017/0323285 | A1* | 11/2017 | Xing | G06Q 20/321 |
| 2019/0228340 | A1 | 7/2019 | Nicol | |
| 2020/0159809 | A1* | 5/2020 | Catthoor | G06N 3/04 |
| 2020/0184337 | A1* | 6/2020 | Baker | G06F 18/285 |
| 2020/0202246 | A1* | 6/2020 | Lin | G06F 16/24568 |
| 2020/0372384 | A1* | 11/2020 | Sun | G06F 17/18 |
| 2020/0410389 | A1* | 12/2020 | Jain | G06F 9/44505 |
| 2021/0044605 | A1* | 2/2021 | Subramanian | H04L 43/0876 |
| 2021/0051088 | A1* | 2/2021 | Kovari | H04L 43/062 |
| 2021/0296565 | A1* | 9/2021 | Chou | B06B 1/0622 |
| 2021/0304891 | A1* | 9/2021 | Kozloski | G16H 50/20 |
| 2023/0126978 | A1* | 4/2023 | Tsoi | G06F 15/825 |
| | | | | 712/201 |
| 2024/0019878 | A1* | 1/2024 | Mathiesen | G05D 7/0113 |
| 2024/0391751 | A1* | 11/2024 | Hartsfield | B67D 1/0021 |

FOREIGN PATENT DOCUMENTS

| | | |
|---|---|---|
| CN | 110046704 A | 7/2019 |
| CN | 110851779 A | 2/2020 |
| CN | 111752887 A | 10/2020 |

\* cited by examiner

ARTIFICIAL INTELLIGENCE CHIP AND ARTIFICIAL INTELLIGENCE CHIP-BASED DATA PROCESSING METHOD

CROSS REFERENCE TO RELATED APPLICATIONS

The present application is a Continuation-In-Part Application of PCT Application No. PCT/CN2021/101414 filed on Jun. 22, 2021, which claims priority to Chinese Patent Application No. 202010575487.1, filed to China Patent Office on Jun. 22, 2020, the entire contents of which are incorporated herein by reference.

TECHNICAL FIELD

Embodiments of the present disclosure relate to the technical field of artificial intelligence (AI), for example, to an AI chip and an AI chip-based data processing method.

BACKGROUND

With the rapid development of AI, there are many AI chips for calculating AI learning models.

At present commonly used AI chips acquire data by means of instruction sets, and process the data according to operation rules of an AI algorithm.

However, resources of AI chips are required to be consumed for acquiring data by means of instruction sets, whereby the AI chips have a low resource utilization rate.

SUMMARY

The following is the summary of the subject matter detailed in the present disclosure. The summary is not intended to limit the scope of the claims.

Embodiments of the present disclosure provide an AI chip and an AI chip-based data processing method, so as to improve the resource utilization rate of AI chips.

According to a first aspect, an embodiment of the present disclosure provides an AI chip, including a data flow network for processing, on the basis of an AI algorithm, data to be processed. The data flow network includes:

at least one calculation module, each configured to calculate, on the basis of one of at least one operation node corresponding to the AI algorithm, the data to be processed, and output a calculation result; and a next transfer module corresponding to each calculation module, connected to each calculation module, and configured to receive the calculation result output by each calculation module and process the calculation result, where the data to be processed flows in the data flow network according to a preset data flow direction.

According to a second aspect, an embodiment of the present disclosure provides an AI chip-based data processing method, including:

calculating, on the basis of one of at least one operation node corresponding to an AI algorithm, data to be processed and outputting a calculation result by each of at least one calculation module in a data flow network, the data flow network being configured to process, on the basis of the AI algorithm, the data to be processed; and receiving the calculation result output by each calculation module and processing the calculation result by a next transfer module, the next transfer module being connected to each calculation module, where the data to be processed flows in the data flow network according to a preset data flow direction.

DETAILED DESCRIPTION

The present disclosure is further described in detail below with reference to the accompanying drawings and embodiments. It may be understood that exemplary embodiments described herein are only used to explain the present disclosure, but not to limit the present disclosure. In addition, it should be further noted that, for ease of description, the accompanying drawings only show parts relevant to the present disclosure rather than the entire structure.

Before discussing exemplary embodiments in more detail, it should be noted that some exemplary embodiments are described as processes or methods depicted as flowcharts. Although the steps are described as a sequential process in the flowcharts, many of the steps may be performed in parallel, concurrently or simultaneously. Furthermore, the order of the steps may be rearranged. The process may be terminated when operations therein are completed, but may also have additional steps not included in the figures. The process may correspond to a method, a function, a procedure, a subroutine, a computer subprogram, etc.

In addition, the terms such as "first" and "second" in this specification may be used for describing various directions, actions, steps, elements, or the like, but the directions, actions, steps, or elements are not limited by the terms. The terms are merely used for distinguishing a first direction, action, step, or element from another direction, action, step, or element.

For example, a first valid signal may be a second valid signal, and similarly, a second valid signal may be referred to as a first valid signal, without departing from the scope of the present disclosure. The first valid signal and the second valid signal are both valid signals, but are not the same valid signal. The terms "first" and "second" cannot be construed as indicating or implying relative importance or implicitly indicating the number of technical features indicated. Therefore, features defining "first" and "second" may explicitly or implicitly include one or more such features. In description of the present disclosure, "plurality" means at least two, such as two and three unless it is specifically defined otherwise.

Figure 1:
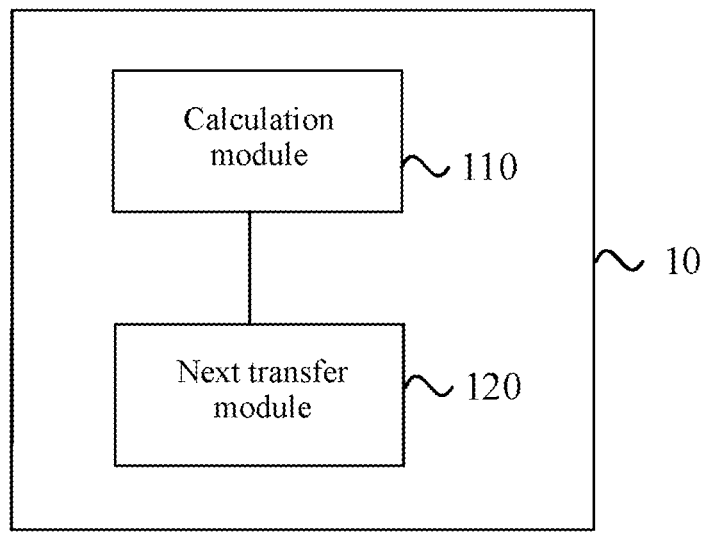
FIG. 1 is a schematic structural diagram of an AI chip according to an embodiment of the present disclosure.

FIG. 1 is a schematic structural diagram of an AI chip according to an embodiment of the present disclosure. As shown in FIG. 1, an embodiment of the present disclosure provides an AI chip 10, including a data flow network for processing, on the basis of an AI algorithm, data to be processed. The data flow network includes: at least one calculation module 110 and a next transfer module 120. The AI chip of this embodiment is adapted to process, on the basis of a preset data flow direction and an AI algorithm, data to be processed.

The calculation module 110 is configured to calculate, on the basis of one of at least one operation node corresponding to the AI algorithm, the data to be processed, and output a calculation result.

The next transfer module 120 corresponding to the current calculation module 110 is configured to receive the calculation result output by the calculation module 110 and process the calculation result.

The data to be processed flows in the data flow network according to a preset data flow direction. In this embodiment, the data to be processed refers to data that needs to be processed by the AI algorithm. For example, the data to be processed may be image data to be processed, text data to be processed, or the like, which may be processed on the basis of the AI algorithm. This is not particularly limited herein. The AI algorithm refers to an algorithm corresponding to an AI model, such as an algorithm corresponding to a convolutional neural network (CNN) model. This is not particularly limited herein. The operation node is a node for calculation in the AI algorithm. It should be noted that the essence of the AI algorithm is some mathematical models, and therefore there are some coefficients. When the AI algorithm is used for calculation, the corresponding coefficients of the AI algorithm and the data to be processed need to be calculated by the calculation module 110. The current calculation module 110 is one of at least one calculation module 110, and the adoption of a certain calculation module 110 as the current calculation module 110 is not limited in this embodiment. The data flow direction is characterized according to the operation order of the AI algorithm and indicates a flow direction of the data to be processed in the data flow network.

Illustratively, the CNN model includes a convolutional layer, a pooling layer and a fully connected layer. Then the CNN algorithm performs calculations at the convolutional layer, then at the pooling layer and finally at the fully connected layer. Then the operation node may be a node calculated at the convolutional layer, the pooling layer or the fully connected layer, or may be one of nodes calculated in the convolutional layer, for example, the calculation module 110 of a first convolutional sub-layer or a second convolutional sub-layer. This is not particularly limited herein.

The next transfer module 120 refers to a next module connected to the current calculation module 110. For example, the next transfer module 120 may be a next calculation module corresponding to the current calculation module 110, or a next storage module corresponding to the current calculation module 110. This may be set as required and is not particularly limited herein. It should be noted that the number of calculation modules 110 may be determined according to an AI algorithm corresponding to a specific AI model, and the data flow direction may also be determined according to the operation process of the AI algorithm. That is, the flow of data to be processed between the calculation module 110 and the next transfer module 120 is determined. This is not particularly limited in this embodiment.

It will be understood that the data to be processed flows in the data flow network according to a preset data flow direction. Neither the calculation module 110 nor the next transfer module 120 needs to acquire the data, and only needs to process the acquired data to be processed when the data reaches the calculation module 110 and the next transfer module 120 according to the data flow direction, thereby reducing the instruction overhead and improving the resource utilization rate of chips.

Figure 2:
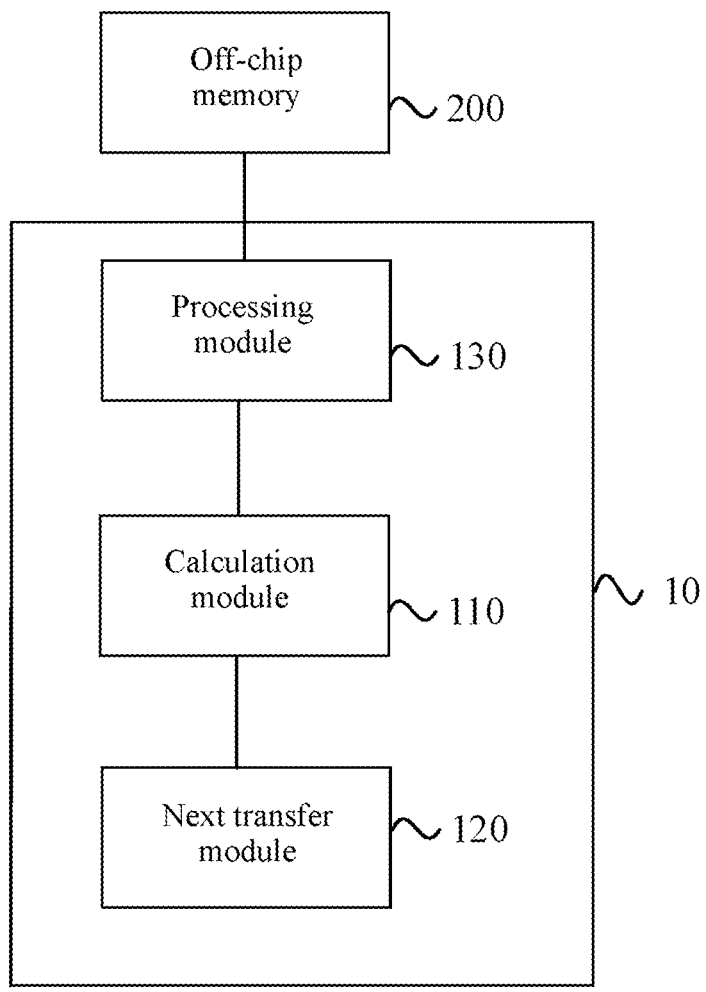
FIG. 2 is a schematic structural diagram of another AI chip according to an embodiment of the present disclosure.

Referring to FIG. 2, FIG. 2 is a schematic structural diagram of another AI chip according to an embodiment of the present disclosure. In one embodiment, for example, the data flow network further includes a processing module 130.

The processing module 130 is configured to process the data to be processed so as to obtain a parameter carried by the data to be processed.

The calculation module 110 is configured to calculate, on the basis of the parameter, the data to be processed.

The processing module 130 may be directly connected to an off-chip memory 200 outside the chip, and is configured to process the data to be processed after receiving the data to be processed transmitted by the off-chip memory 200 so as to obtain a parameter required for calculation by the data flow network, whereby the calculation module 110 in the data flow network calculates, on the basis of the parameter, the data to be processed.

Figure 3:
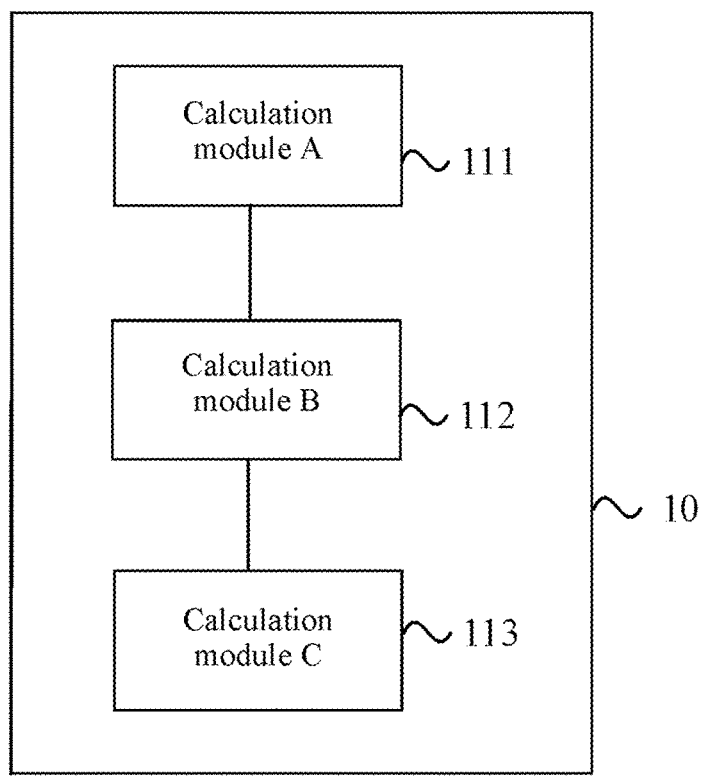
FIG. 3 is a schematic structural diagram of an AI chip running a CNN model according to an embodiment of the present disclosure.

Referring to FIG. 3, FIG. 3 is a schematic structural diagram of an AI chip running a CNN model according to an embodiment of the present disclosure. It can be seen from FIG. 3 that the data to be processed in this embodiment is image data to be processed, and the AI chip includes a calculation module A111, a calculation module B112 and a calculation module C113. The calculation module A111 is configured to calculate at the convolutional layer, the calculation module B112 is configured to calculate at the pooling layer, and the calculation module C113 is configured to calculate at the fully connected layer. Then the preset data flow direction is the calculation module A111, the calculation module B112 and the calculation module C113 in sequence. It will be understood that the image data to be processed flows in the calculation module A111, the calculation module B112 and the calculation module C113 according to the preset data flow direction. When the image data reaches the calculation module A111, the image data is calculated at the convolutional layer. After the calculation is completed, the image data reaches the calculation module B112 and is calculated at the pooling layer. Finally, the image data reaches the calculation module C113 and is calculated at the fully connected layer. A final calculation result is output. The final calculation result may be stored in the off-chip memory outside the AI chip. This is not particularly limited herein. Referring to both FIGS. 1 and 3, when the calculation module A111 is the current calculation module 110, the corresponding next transfer module 120 is the calculation module B112, and when the calculation module C113 is the current calculation module 110, the corresponding next transfer module 120 is a final storage module for storing the final calculation result (the storage module is not shown in FIGS. 1 and 3).

For example, when an intermediate storage module is disposed between two adjacent calculation modules 110 such as the calculation module A111 and the calculation module B112, the next transfer module 120 of the calculation module A111 is the intermediate storage module. This is not particularly limited herein. It will be understood that when the previous calculation module 110 has completed the calculation but the next calculation module 110 has not completed the calculation, the calculation result of the previous calculation module 110 is transmitted to the intermediate storage module for waiting. Then the previous calculation module 110 may be in an idle state and continue to acquire new data for calculation, and when the next calculation module 110 completes the calculation, the intermediate storage module transmits the calculation result of the previous calculation module 110 to the next calculation module for calculation, thereby further improving the resource utilization rate of chips.

It will be understood that the previous calculation module 110 and the next calculation module 110 of this embodiment represent only two calculation modules 110 where data interaction exists, and are not limited to a particular calculation module 110.

It should be noted that in order to maximize the resource utilization of chips, the flow of data needs to ensure that there is just no idle time between the calculation module 110 and the next transfer module 120. This is not particularly limited in this embodiment.

Figure 4:
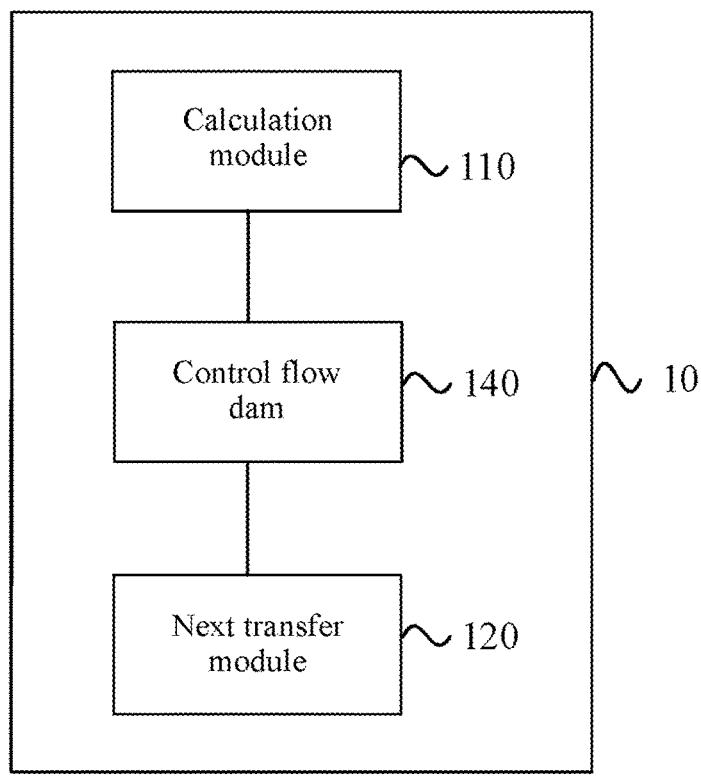
FIG. 4 is a schematic structural diagram of another AI chip according to an embodiment of the present disclosure.

Referring to FIG. 4, FIG. 4 is a schematic structural diagram of another AI chip according to an embodiment of the present disclosure. A control flow dam 140 is disposed between the current calculation module 110 and the next transfer module 120 in this embodiment. The control flow dam 140 is configured to control the flow of the calculation result from the current calculation module 110 to the next transfer module 120.

For example, in order to achieve automatic flow control between the calculation module 110 and the next transfer module 120 through the control flow dam 140, the basic idea is as follows:

A) Input data rate (F_in)=number of valid input data/unit time (T_d)

B) Output data rate (F_out)=number of valid output data/unit time (T_d)

C) During the entire run, if F_in=F_out, then data can be streaming through the hardware module without blockage.

To completely avoid back pressure: a data dam should be able to store data max(F_in)-min(F_out). The control flow dam 140 combines internal states of the calculation module 110 and the next transfer module 120. Hardware is purely required to determine whether to flow data out of the current calculation module 110. Therefore, the control flow dam 140 may be understood as a barrier that adjusts the data flow. Based on algorithm requirements, the control flow dam 140 is further expanded to support predetermined static flow control.

For example, the control flow dam 140 includes a write end, a read end, a full-load end, and a no-load end, and further includes:

a first AND gate, connected to the write end to constitute an uplink valid end, the uplink valid end being configured to receive a first valid signal transmitted by the current calculation module 110;

a second AND gate, connected to the read end to constitute a downlink permission end, the downlink permission end being configured to receive a second valid signal transmitted by the next transfer module 120;

a first NOT gate, connected to the full-load end to constitute an uplink permission end, the uplink permission end being configured to transmit a first permission signal to the current calculation module 110 and the first AND gate; and a second NOT gate, connected to the no-load end to constitute a downlink valid end, the downlink valid end being configured to transmit the second valid signal to the next transfer module 120 and the second AND gate.

For example, the current calculation module 110 is configured to receive a first permission signal transmitted by the control flow dam 140.

The current calculation module 110 provides the first valid signal to the control flow dam 140 so as to write target data in the data to be processed into the control flow dam 140, and the current calculation module 110 is configured to process the target data according to a processing mode pointed by the operation node so as to obtain the calculation result. The target data is data in the data to be processed which is suitable for calculation by the current calculation module 110.

The control flow dam 140 is configured to receive a second permission signal transmitted by the next transfer module 120. The control flow dam 140 provides the second valid signal to the next transfer module 120 so as to write the calculation result into the next transfer module 120.

In this embodiment, the current calculation module 110 receives a first permission signal transmitted by the control flow dam 140. That is, it indicates that the control flow dam 140 is ready to receive data to be written in the current calculation module 110. After the current calculation module 110 receives the first permission signal transmitted by the control flow dam 140, the current calculation module 110 may read the calculation result. The current calculation module 110 provides a first valid signal to the control flow dam 140. That is, it indicates that the current calculation module 110 may write the calculation result into the control flow dam 140. After the control flow dam 140 receives the first valid signal transmitted by the current calculation module 110, the control flow dam 140 may write the calculation result.

When the current calculation module 110 receives a first permission signal transmitted by the control flow dam 140 and the control flow dam 140 also receives a first valid signal transmitted by the current calculation module 110, the calculation result starts to be written into the control flow dam 140 from the current calculation module 110. When either signal stops to be transmitted, i.e. the control flow dam 140 stops transmitting the first permission signal to the current calculation module 110 or the current calculation module 110 stops transmitting the first valid signal to the control flow dam 140, transmission of the communication will be stopped immediately. At this moment, the calculation result has been written into the control flow dam 140 from the current calculation module 110, and the calculation result is stored in the control flow dam 140. The control flow dam 140 receives a first permission signal transmitted by the next transfer module 120. That is, it indicates that the next transfer module 120 is ready to receive data to be written in the control flow dam 140. After the control flow dam 140 receives a second permission signal transmitted by the next transfer module 120, the next transfer module 120 may read the calculation result. The control flow dam 140 provides a second valid signal to the next transfer module 120. That is, it indicates that the control flow dam 140 may write the calculation result into the next transfer module 120. After the next transfer module 120 receives a second valid signal transmitted by the control flow dam 140, the next transfer module 120 may write the calculation result.

When the control flow dam 140 receives a first permission signal transmitted by the next transfer module 120 and the next transfer module 120 also receives a second valid signal transmitted by the control flow dam 140, the calculation result starts to be written into the next transfer module 120 from the control flow dam 140. When either signal stops to be transmitted, i.e. the next transfer module 120 stops transmitting the second permission signal to the control flow dam 140 or the control flow dam 140 stops transmitting the second valid signal to the next transfer module 120, transmission of the communication will be stopped immediately. The transmission of the calculation result from the current calculation module 110 to the next transfer module 120 is completed accordingly. Furthermore, it should be noted that the calculation results do not refer to the calculation results in order, and the calculation results may be any piece of data in the actual communication.

According to the technical solution of the embodiments of the present disclosure, the AI chip includes a data flow network for processing, on the basis of an AI algorithm, data to be processed. The data flow network includes at least one calculation module, configured to calculate, on the basis of one operation node corresponding to the AI algorithm, the data to be processed, and output a calculation result; and a next transfer module corresponding to the current calculation module, configured to receive the calculation result output by the calculation module and process the calculation result, the data to be processed flowing in the data flow network according to a preset data flow direction. The situation of low resource utilization rate of an AI chip caused by the fact that resources of the AI chip are required to be consumed for the AI chip to acquire data by means of instruction sets is avoided, thereby improving the resource utilization rate of the AI chip.

Figure 5:
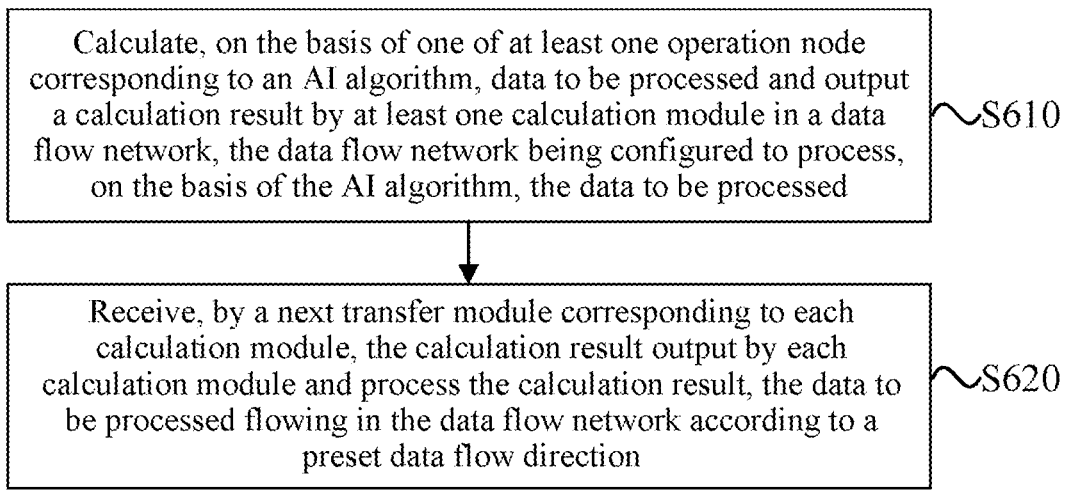
FIG. 5 shows an AI chip-based data processing method according to an embodiment of the present disclosure.

FIG. 5 shows an AI chip-based data processing method according to an embodiment of the present disclosure. The method may be applied to a scenario where data to be processed is processed on the basis of a preset data flow direction and an AI algorithm. The method may be implemented by an AI chip according to this embodiment.

As shown in FIG. 5, the AI chip-based data processing method according to an embodiment of the present disclosure includes the following steps:

S610: Calculate, on the basis of one operation node corresponding to an AI algorithm, data to be processed and output a calculation result by at least one calculation module in a data flow network, the data flow network being configured to process, on the basis of the AI algorithm, the data to be processed.

The data flow network refers to a network formed by various modules in an AI chip for processing, on the basis of the AI algorithm, data to be processed. The data to be processed refers to data that needs to be processed by the AI algorithm. For example, the data to be processed may be image data to be processed, text data to be processed, or the like, which may be processed on the basis of the AI algorithm. This is not particularly limited herein. The AI algorithm refers to an algorithm corresponding to an AI model, such as an algorithm corresponding to a CNN model. This is not particularly limited herein. The operation node is a node for calculation in the AI algorithm. It should be noted that the essence of the AI algorithm is some mathematical models, and therefore there are some coefficients. When the AI algorithm is used for calculation, the corresponding coefficients of the AI algorithm and the data to be processed need to be calculated by the calculation module.

Illustratively, the CNN model includes a convolutional layer, a pooling layer and a fully connected layer. Then the CNN algorithm performs calculations at the convolutional layer, then at the pooling layer and finally at the fully connected layer. Then the operation node may be a node calculated at the convolutional layer, the pooling layer or the fully connected layer, or may be one of nodes calculated in the convolutional layer, for example, the calculation module of a first convolutional sub-layer or a second convolutional sub-layer. This is not particularly limited herein.

S620: Receive, by a next transfer module corresponding to the current calculation module, the calculation result output by the calculation module and process the calculation result, the data to be processed flowing in the data flow network according to a preset data flow direction.

The current calculation module is one of at least one calculation module, and the adoption of a certain calculation module as the current calculation module is not limited in this embodiment. The next transfer module refers to a next module connected to the current calculation module. For example, the next transfer module may be a next calculation module corresponding to the current calculation module, or a next storage module corresponding to the current calculation module. This may be set as required and is not particularly limited herein. It should be noted that the number of calculation modules may be determined according to an AI algorithm corresponding to a specific AI model, and the data flow direction may also be determined according to the operation process of the AI algorithm. That is, the flow of data to be processed between the calculation module and the next transfer module is determined. This is not particularly limited in this embodiment.

It will be understood that the data to be processed flows in the data flow network according to a preset data flow direction. Neither the calculation module nor the next transfer module needs to acquire the data, and only needs to process the acquired data to be processed when the data reaches the calculation module and the next transfer module according to the data flow direction, thereby reducing the instruction overhead and improving the resource utilization rate of chips.

In an example implementation, the AI chip-based data processing method further includes the following steps.

A processing module in the data flow network processes the data to be processed so as to obtain a parameter carried by the data to be processed. The calculating, on the basis of one operation node corresponding to an AI algorithm, data to be processed by the calculation module includes: determining one operation node corresponding to the AI algorithm corresponding to the calculation module; and calculating, by the calculation module, the parameter on the basis of the operation node.

The processing module may be directly connected to an off-chip memory outside the chip, and is configured to process the data to be processed after receiving the data to be processed transmitted by the off-chip memory so as to obtain a parameter required for calculation by the data flow network, whereby the calculation module in the data flow network calculates, on the basis of the parameter, the data to be processed.

For example, a target calculation module corresponding to a calculation bottleneck in the data flow network may be configured as at least two target calculation sub-modules for serial calculation, or a target calculation module corresponding to a calculation bottleneck in the data flow network may be configured as at least two target calculation sub-modules for parallel calculation, so as to maximize the resource utilization rate of chips.

In an example implementation, a control flow dam is disposed between the current calculation module and the next transfer module. The AI chip-based data processing method further includes: controlling, by the control flow dam, the flow of the calculation result from the current calculation module to the next transfer module.

For example, in order to achieve automatic flow control between the calculation module and the next transfer module through the control flow dam, the basic idea is as follows:

A) Input data rate (F_in)=number of valid input data/unit time (T_d)
B) Output data rate (F_out)=number of valid output data/unit time (T_d)
C) During the entire run, if F_in=F_out, then data can be streaming through the hardware module without blockage.

To completely avoid back pressure: a data dam should be able to store data max(F_in)-min(F_out). The control flow dam combines internal states of the calculation module and the next transfer module. Hardware is purely required to determine whether to flow data out of the current calculation module. Therefore, the control flow dam may be understood as a barrier that adjusts the data flow. Based on algorithm requirements, the control flow dam is further expanded to support predetermined static flow control.

In an example implementation, the control flow dam includes a write end, a read end, a full-load end, and a no-load end, and further includes: a first AND gate, a second AND gate, a first NOT gate, and a second NOT gate. The first AND gate is connected to the write end to constitute an uplink valid end, the second AND gate is connected to the read end to constitute a downlink permission end, the first NOT gate is connected to the full-load end to constitute an uplink permission end, and the second NOT gate is connected to the no-load end to constitute a downlink valid end. The AI chip-based data processing method further includes: receiving, by the uplink valid end, a first valid signal transmitted by the current calculation module; receiving, by the downlink permission end, a second valid signal transmitted by the next transfer module; transmitting, by the first uplink permission end, a first permission signal to the current calculation module and the first AND gate, so as to trigger the transmission of data from the current calculation module to the control flow dam; and transmitting, by the downlink valid end, the second valid signal to the next transfer module and the second AND gate, so as to trigger the transmission of the data of the current calculation module stored in the control flow dam to the next transfer module. The first valid signal and the first permission signal are for controlling the flow of data flow from the current calculation module to the control flow dam, and the second valid signal and the second permission signal are for controlling the flow of data flow from the control flow dam to the next transfer module. The data in the current calculation module flows into the control flow dam and is stored by the control flow dam, and when the condition is satisfied, the control flow dam transmits the stored data to the next transfer module.

For example, the current calculation module provides the first valid signal to the control flow dam so as to write target data in the data to be processed into the control flow dam, and the current calculation module is configured to process the target data according to a processing mode pointed by the operation node so as to obtain the calculation result.

The control flow dam is configured to receive the second permission signal transmitted by the next transfer module.

The control flow dam is configured to provide the second valid signal to the next transfer module to write the calculation result into the next transfer module.

In the present implementation, the current calculation module receives a first permission signal transmitted by the control flow dam. That is, it indicates that the control flow dam is ready to receive data to be written in the current calculation module. After the current calculation module receives the first permission signal transmitted by the control flow dam, the current calculation module may read the calculation result. The current calculation module provides a first valid signal to the control flow dam. That is, it indicates that the current calculation module may write the calculation result into the control flow dam. After the control flow dam receives the first valid signal transmitted by the current calculation module, the control flow dam may write the calculation result.

When the current calculation module receives a first permission signal transmitted by the control flow dam and the control flow dam also receives a first valid signal transmitted by the current calculation module, the calculation result starts to be written into the control flow dam from the current calculation module. When either signal stops to be transmitted, i.e. the control flow dam stops transmitting the first permission signal to the current calculation module or the current calculation module stops transmitting the first valid signal to the control flow dam, transmission of the communication will be stopped immediately. At this moment, the calculation result has been written into the control flow dam from the current calculation module, and the calculation result is stored in the control flow dam. The control flow dam receives a second permission signal transmitted by the next transfer module. That is, it indicates that the next transfer module is ready to receive data to be written in the control flow dam. After the control flow dam receives a second permission signal transmitted by the next transfer module, the next transfer module may read the calculation result. The control flow dam provides a second valid signal to the next transfer module. That is, it indicates that the control flow dam may write the calculation result into the next transfer module. After the next transfer module receives a second valid signal transmitted by the control flow dam, the next transfer module may write the calculation result.

When the control flow dam receives a second permission signal transmitted by the next transfer module and the next transfer module also receives a second valid signal transmitted by the control flow dam, the calculation result starts to be written into the next transfer module from the control flow dam. When either signal stops to be transmitted, i.e. the next transfer module stops transmitting the second permission signal to the control flow dam or the control flow dam stops transmitting the second valid signal to the next transfer module, transmission of the communication will be stopped immediately. The transmission of the calculation result from the current calculation module to the next transfer module is completed accordingly. Furthermore, it should be noted that the calculation results do not refer to the calculation results in order, and the calculation results may be any piece of data in the actual communication.

According to the technical solution of the embodiments of the present disclosure, on the basis of one operation node corresponding to an AI algorithm, data to be processed is calculated and a calculation result is output by at least one calculation module in a data flow network. The data flow network is configured to process, on the basis of the AI algorithm, the data to be processed. A next transfer module corresponding to the current calculation module receives the calculation result output by the calculation module and processes the calculation result. The data to be processed flows in the data flow network according to a preset data flow direction, thereby improving the resource utilization rate of AI chips.

It should be noted that the above is only an example embodiment of the present disclosure and the technical principles employed. It will be understood by those skilled in the art that the present disclosure is not limited to the particular embodiments described herein, and that various obvious changes, rearrangements and substitutions can be made by those skilled in the art without departing from the scope of the present disclosure. Therefore, while the present disclosure has been described in considerable detail with reference to the above embodiments, the present disclosure is not limited to the above embodiments, more other equivalent embodiments may also be included without departing from the conception of the present disclosure, and the scope of the present disclosure is determined by the scope of the appended claims.

Figure 4A:
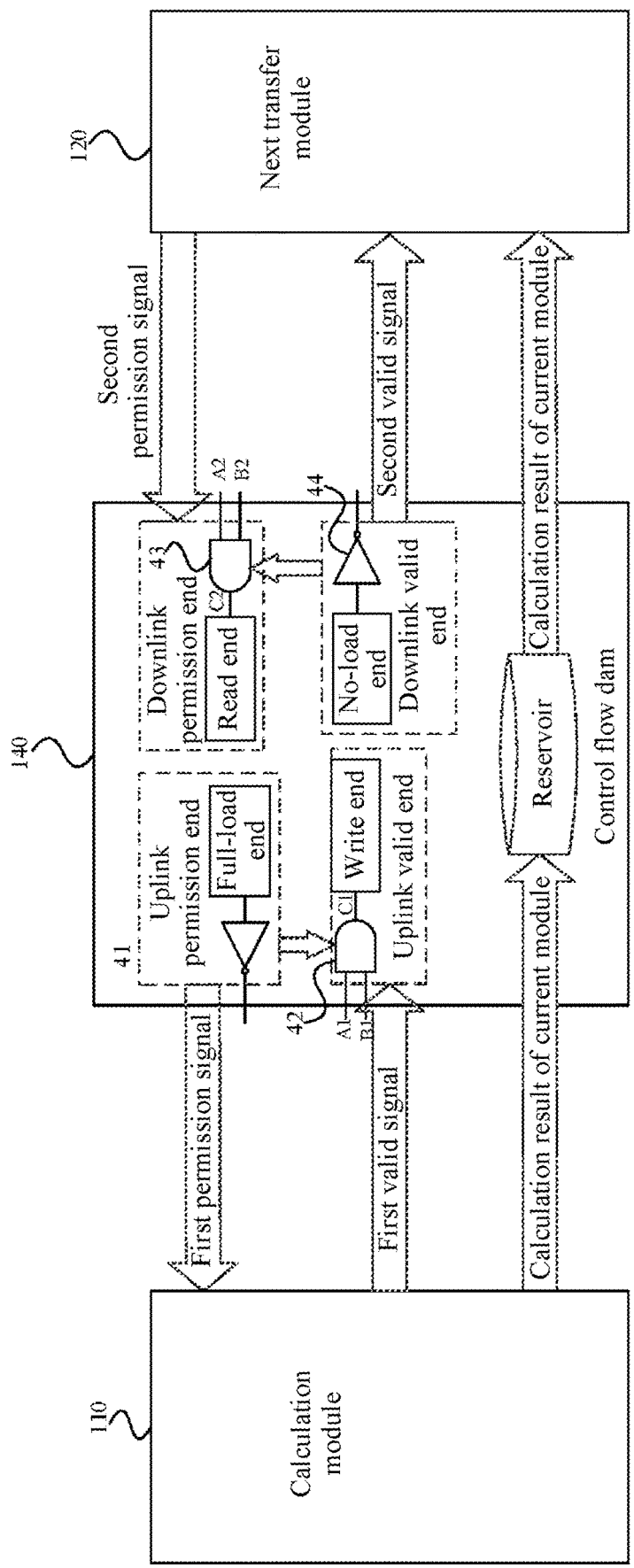
FIG. 4A is a schematic structural diagram of a control flow dam in an AI chip according to an embodiment of the present disclosure.

FIG. 4A is a schematic structural diagram of a control flow dam in an AI chip according to an embodiment of the present disclosure. The control flow dam includes: an uplink permission end constituted by a first NOT gate 41 and a full-load end, an uplink valid end constituted by a first AND gate 42 and a write end, a downlink permission end constituted by a second AND gate 43 and a read end, and a downlink valid end constituted by a second NOT gate 44 and a no-load end. A reservoir is also included in the control flow dam and configured to store data. The uplink permission end transmits a first permission signal to the current calculation module and the first AND gate 42. The uplink valid end receives a first valid signal transmitted by the current calculation module. In the first AND gate 42, an event represented by A1 is "the current calculation module transmits the first valid signal to the uplink valid end", an event represented by B1 is "the uplink permission end transmits the first permission signal to the current calculation module", and an event represented by C1 is "the calculation result of the current calculation module is written into the control flow dam". The downlink valid end transmits a second valid signal to the next transfer module and the second AND gate. The downlink permission end receives a second valid signal transmitted by the next transfer module. In the second AND gate 43, an event represented by A2 is "the downlink permission end receives the second permission signal transmitted by the next transfer module", an event represented by B2 is "the downlink valid end transmits the second valid signal to the next transfer module", and an event represented by C2 is "the next transfer module reads the calculation result of the current calculation module". When the current calculation module 110 transmits the first valid signal to the control flow dam 140 and the control flow dam 140 transmits the first permission signal to the current calculation module 110, the calculation result of the current calculation module 110 may flow to the reservoir in the control flow dam 140 for storage. When the next transfer module 120 transmits the second permission signal to the control flow dam 140, and the control flow dam 140 transmits the second valid signal to the next transfer module 120, the next transfer module 120 reads the calculation result stored in the control flow dam 140.

What is claimed is:

1. An artificial intelligence (AI) chip, comprising a data flow network for processing, on a basis of an AI algorithm, data to be processed, the data flow network comprising:
at least one calculation module, each configured to calculate, on a basis of one of at least one operation node corresponding to the AI algorithm, the data to be processed, and output a calculation result; and
a next transfer module corresponding to each calculation module, connected to each calculation module, and configured to receive the calculation result output by each calculation module and process the calculation result,
wherein the data to be processed flows in the data flow network according to a preset data flow direction;
wherein a control flow dam is disposed between each calculation module and the next transfer module, the control flow dam being configured to control a flow of the calculation result from each calculation module to the next transfer module;
wherein the control flow dam comprises a write end, a read end, a full-load end, and a no-load end, and further comprises:
a first AND gate connected to the write end to constitute an uplink valid end, the uplink valid end being configured to receive a first valid signal transmitted by each calculation module;
a second AND gate connected to the read end to constitute a downlink permission end, the downlink permission end being configured to receive a second permission signal transmitted by the next transfer module;
a first NOT gate connected to the full-load end to constitute an uplink permission end, the uplink permission end being configured to transmit a first permission signal to each calculation module and the first AND gate; and
a second NOT gate connected to the no-load end to constitute a downlink valid end, the downlink valid end being configured to transmit a second valid signal to the next transfer module and the second AND gate.

2. The AI chip according to claim 1, wherein the data flow network further comprises:
a processing module configured to process the data to be processed so as to obtain a parameter carried by the data to be processed,
the calculation module being configured to calculate, on a basis of the parameter, the data to be processed.

3. The AI chip according to claim 1, wherein each calculation module is configured to receive a first permission signal transmitted by the control flow dam;
each calculation module provides the first valid signal to the control flow dam so as to write target data in the data to be processed into the control flow dam, and each calculation module is configured to process the target data according to a processing mode pointed by the operation node so as to obtain the calculation result;
the control flow dam is configured to receive the second permission signal transmitted by the next transfer module; and
the control flow dam is configured to provide the second valid signal to the next transfer module to write the calculation result into the next transfer module.

4. An artificial intelligence (AI) chip-based data processing method, comprising:
calculating, on a basis of one of at least one operation node corresponding to an AI algorithm, data to be processed and outputting a calculation result by each of at least one calculation module in a data flow network, the data flow network being configured to process, on a basis of the AI algorithm, the data to be processed; and
receiving, by a next transfer module corresponding to each calculation module, the calculation result output by each calculation module and processing the calculation result, the next transfer module being connected to each calculation module,
wherein the data to be processed flows in the data flow network according to a preset data flow direction;
wherein a control flow dam is disposed between each calculation module and the next transfer module, the method further comprising:

controlling, by the control flow dam, a flow of the calculation result from each calculation module to the next transfer module;
wherein the control flow dam comprises a write end, a read end, a full-load end, and a no-load end, and further comprises: a first AND gate, a second AND gate, a first NOT gate, and a second NOT gate; the first AND gate is connected to the write end to constitute an uplink valid end, the second AND gate is connected to the read end to constitute a downlink permission end, the first NOT gate is connected to the full-load end to constitute an uplink permission end, and the second NOT gate is connected to the no-load end to constitute a downlink valid end, the method further comprising:
receiving, by the uplink valid end, a first valid signal transmitted by each calculation module;
receiving, by the downlink permission end, the second permission signal transmitted by the next transfer module;
transmitting, by the first uplink permission end, a first permission signal to each calculation module and the first AND gate; and
transmitting, by the downlink valid end, a second valid signal to the next transfer module and the second AND gate.

5. The method according to claim 4, further comprising:
processing, by a processing module in the data flow network, the data to be processed so as to obtain a parameter carried by the data to be processed,
wherein the step of calculating, on a basis of one of at least one operation node corresponding to an AI algorithm, data to be processed by each calculation module comprises:
determining one of at least one operation node corresponding to the AI algorithm corresponding to each calculation module; and
calculating, by each calculation module, the parameter on a basis of the determined operation node.

6. The method according to claim 4, wherein each calculation module provides the first valid signal to the control flow dam so as to write target data in the data to be processed into the control flow dam, and each calculation module is configured to process the target data according to a processing mode pointed by the operation node so as to obtain the calculation result;
the control flow dam receives the second permission signal transmitted by the next transfer module; and
the control flow dam provides the second valid signal to the next transfer module to write the calculation result into the next transfer module.

* * * * *